United States Patent
Boyer et al.

(10) Patent No.: US 7,336,779 B2
(45) Date of Patent: Feb. 26, 2008

(54) TOPICAL DYNAMIC CHAT

(75) Inventors: David G. Boyer, Oceanport, NJ (US);
Sally Cartwright, Westminster, CO (US); Susan K. Harkreader, Arvada, CO (US); Thomas L. Hemm, Boulder, CO (US); Joylee Kohler, Northglenn, CO (US); Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 788 days.

(21) Appl. No.: 10/098,824

(22) Filed: Mar. 15, 2002

(65) Prior Publication Data
US 2003/0174830 A1    Sep. 18, 2003

(51) Int. Cl.
*H04M 3/00* (2006.01)
*H04M 5/00* (2006.01)

(52) U.S. Cl. .............................. 379/265.02; 379/265.09
(58) Field of Classification Search .................
379/265.01–265.14, 266.01–266.1
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. ............... 379/309 |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |

(Continued)

FOREIGN PATENT DOCUMENTS

CA    2143198    1/1995

(Continued)

OTHER PUBLICATIONS

U.S. Appl. No. 09/756,955, filed Jan. 9, 2001, Flockhart et al.

(Continued)

*Primary Examiner*—William J. Deane, Jr.
(74) *Attorney, Agent, or Firm*—Sheridan Ross P.C.

(57) ABSTRACT

The present invention is directed to a customer contact 100 in which a session monitor 140 identifies and implements multi-customer sessions. A conferencing function 136 connects the plurality of customers 110-118 simultaneously to the same resource and/or to each other. Participation in the sessions can be mandatory or optional. The sessions can be created continually or periodically, such as when the contact center 100 is in an session mode. The sessions can be closed or open to new customers after commencement.

47 Claims, 9 Drawing Sheets

U.S. PATENT DOCUMENTS

| | | |
|---|---|---|
| 5,390,243 A | 2/1995 | Casselman et al. |
| 5,436,965 A | 7/1995 | Grossman et al. |
| 5,444,744 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. ............ 379/266 |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. ................ 379/309 |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. ............ 379/266 |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. ........... 379/266 |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. ........... 379/265 |
| 6,084,954 A | 7/2000 | Harless et al. .............. 379/140 |
| 6,088,441 A | 7/2000 | Flockhart et al. ........... 379/265 |
| 6,115,462 A | 9/2000 | Servi et al. |
| 6,151,571 A | 11/2000 | Pertrushin ................... 704/209 |
| 6,154,769 A | 11/2000 | Cherkasova et al. |
| 6,163,607 A | 12/2000 | Bogart et al. ................ 379/266 |
| 6,173,053 B1 | 1/2001 | Bogart et al. ................ 379/266 |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. ........... 379/266 |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. .............. 700/264 |
| 6,263,359 B1 | 7/2001 | Fong et al. |
| 6,272,544 B1 | 8/2001 | Mullen |
| 6,275,806 B1 | 8/2001 | Pertrushin ................... 704/272 |
| 6,275,812 B1 | 8/2001 | Haq et al. |
| 6,275,991 B1 | 8/2001 | Erlin .......................... 725/141 |
| 6,278,777 B1 | 8/2001 | Morley et al. .............. 379/265 |
| 6,292,550 B1 | 9/2001 | Burritt ....................... 379/201 |
| 6,295,353 B1 | 9/2001 | Flockhart et al. |
| 6,339,754 B1 * | 1/2002 | Flanagan et al. .............. 704/2 |
| 6,353,810 B1 | 3/2002 | Petrushin .................... 704/236 |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,400 B1 | 5/2002 | Bushey et al. |
| 6,427,137 B2 | 7/2002 | Petrushin .................... 704/273 |
| 6,430,282 B1 | 8/2002 | Bannister et al. |
| 6,449,356 B1 | 9/2002 | Dezonno |
| 6,453,038 B1 | 9/2002 | McFarlane et al. |
| 6,463,346 B1 | 10/2002 | Flockhart et al. |
| 6,463,415 B2 | 10/2002 | St. John ..................... 704/273 |
| 6,480,826 B2 | 11/2002 | Pertrushin ................... 704/270 |
| 6,535,600 B1 | 3/2003 | Fisher et al. ........... 379/265.12 |
| 6,553,114 B1 | 4/2003 | Fisher et al. |
| 6,574,599 B1 | 6/2003 | Lim et al. |
| 6,597,685 B2 | 7/2003 | Miloslavsky et al. |
| 6,757,362 B1 | 6/2004 | Cooper et al. |
| 6,766,013 B2 | 7/2004 | Flockhart et al. |
| 7,076,051 B2 | 7/2006 | Brown et al. |
| 7,100,200 B2 | 8/2006 | Pope et al. |
| 7,215,744 B2 | 5/2007 | Scherer |
| 2001/0056349 A1 | 12/2001 | St. John ..................... 704/270 |
| 2001/0056367 A1 | 12/2001 | Herbert et al. |
| 2002/0002460 A1 | 1/2002 | Pertrushin ................... 704/270 |
| 2002/0002464 A1 | 1/2002 | Petrushin .................... 704/275 |
| 2002/0010587 A1 | 1/2002 | Pertrushin ................... 704/275 |
| 2002/0038422 A1 | 3/2002 | Suwamoto et al. |

| | | | |
|---|---|---|---|
| 2002/0073208 | A1* | 6/2002 | Wilcock et al. |
| 2002/0112186 | A1 | 8/2002 | Ford et al. |
| 2002/0194002 | A1 | 12/2002 | Petrushin .................... 704/270 |
| 2003/0144959 | A1 | 7/2003 | Makita |
| 2004/0008828 | A1 | 1/2004 | Coles et al. |
| 2005/0021529 | A1 | 1/2005 | Hodson et al. |
| 2005/0027612 | A1* | 2/2005 | Walker et al. |
| 2005/0043986 | A1 | 2/2005 | McConnell et al. |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 829 996 A2 | 3/1998 |
| EP | 0 855 826 A2 | 7/1998 |
| EP | 0 863 651 A2 | 9/1998 |
| EP | 0 866 407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97-28635 | 8/1997 |
| WO | WO 98/56207 | 12/1998 |

OTHER PUBLICATIONS

U.S. Appl. No. 09/416,737, filed Oct. 13, 1999, Acui et al.
E. Noth et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz.
Presentation by Victor Zue, *The MIT Ox90ygen Project*, MIT Laboratory for Computer Science (Apr. 25-26, 2000).
MIT Project Oxygen, *Pervasive, Human-Centered Computing* (MIT Laboratory for Computer Science) (Jun. 2000).
U.S. Appl. No. 09/235,065, Denton et al.
Microsoft Office Animated Help Tool.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
Dawson, "NPRI's Powerguide, Software Overview" Call Center Magazine (Jun. 1993), p. 85.
"Applications, NPRI's Predictive Dialing Package," Computer Technology (Fall 1993), p. 86.
"Call Center Software You Can't Outgrow," Telemarketing® (Jul. 1993), p. 105.
"VAST™, Voicelink Application Software for Teleservicing®," System Manager User's Guide, Digital Systems (1994), pp. ii, vii-ix, 1-2, 2-41 through 2-77.

Geotel Communications Corporation Web site printout entitled "Intelligent CallRouter Optimizing the Interaction Between Customers and Answering Resources." 6 pages, 2000.
Avaya, Inc. CentreVu Advocate, Release 9, User Guide, Dec. 2000.
"Internet Protocol Addressing," available at http://samspade.org/d/ipdns.html, downloaded Mar. 31, 2003, 9 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
S. Ahmed, "A Scalable Byzantine Fault Tolerant Secure Domain Name System," thesis submitted to MIT Dept of Electrical Engineering & Computer Science, Jan. 22, 2001, 101 pages.
Coles, Scott, "A Guide for Ensuring Service Quality In IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
Stevenson et al.; "Name Resolution in Network and Systems Management 2004 Environments"; http://netman.cit.buffalo.edu/Doc/DStevenson/NR-NMSE.html; 16 pages.
Doo-Hyun Kim et al. "Collaborative Multimedia Middleware Architecture and Advanced Internet Call Center"; ProceedingsInternational Conference on Information Networking (Jan. 31, 2001), pp. 246-250.
No Author, "When Talk Isn't Cheap" Sm@rt Reseller, v. 3, n. 13 (Apr. 3, 2000), p. 50.
No Author, "eGain's Commerce 2000 Platform Sets New Standard for eCommerce Customer Communications" Business Wire (Nov. 15, 1999).
DEFINITY Communications System Generic 3 Call Vectoring-Expert Agent Selection (EAS) Guide, AT&T publication No. 555-230-520 (Issue 3, Nov. 1993).
L.F. Lamel and J.L. Gauvain, *Language Identification Using Phone-Based Acoustic Likelihoods*, ICASSP-94, 4 pages, 1994.
John H.L. Hansen and Levent M. Arslan, *Foreign Accent Classificatino Using Source Generator Based Prosodic Features*, IEEE Proc. ICASSP, vol. 1, pp. 836-839, Detroit USA (May 1995).
Levent M. Arslan and John H.L. Hansen, *Language Accent Classification in American English*, Robust Speech Processing Laboratory, Duke University Department of Electrical Engineering, Durham, NC, Technical Report RSPL-96-7, revised Jan. 29, 1996.
Levent M. Arslan, *Foreign Accent Classification in American English*, Department of Electrical Computer Engineering, Duke University, Thesis, pp. 1-200 (1996).
"Still Leaving It To Fate?: Optimizing Workforce Management", Durr, William Jr., Nov., 2001.

\* cited by examiner

TOPICAL DYNAMIC CHAT

CROSS REFERENCE TO RELATED APPLICATIONS

Cross reference is made to U.S. patent application Ser. Nos. 09/756,955, filed Jan. 9, 1999, entitled "Customer Service by Batch", and 09/416,737, filed Oct. 13, 1999, entitled "Multi-Tasking, Web-Based Call Center", which are incorporated herein by this reference.

FIELD OF THE INVENTION

The present invention relates generally to contact centers and specifically to customer relationship management in contact centers.

BACKGROUND OF THE INVENTION

A customer contact center typically must balance the quality of service that it provides against the cost of providing such service. When personalized service is needed, an automatic call distribution system (or ACD) typically connects a customer to a contact center agent who has the skills that are needed to service the customer. The agent serves only one customer at a time. This personalized treatment generally leads to a high quality of service, with the main limitation on the quality of service being the number of available agents, but it can be very expensive. Additional problems are that an agent typically repeatedly handle the same requests and customers often must wait in long queues at busy times. Customers waiting in queues typically have the choice to either continue waiting in the queue or call back at a later time.

To reduce costs, many contact centers offer some form of automated self-service, such as an interactive voice response (IVR) system, to customers. Each customer is connected to a separate port of the IVR system for service. The cost of providing service via the IVR system is generally substantially lower, but a desirable quality of service is not always achieved, as the IVR system is not as flexible and responsive as a human agent. Moreover, some customers are reluctant to use such systems.

SUMMARY OF THE INVENTION

These and other needs are addressed by the various embodiments and configurations of the present invention. The present invention relates generally to the use of parallel communication in a communication system to exchange pertinent information and/or resolve customer issues. Parallel communication enables use of a one-resource-to-many-customers forum or multi-customer session. As used herein, a session refers to a communicative interaction between two or more interconnected entities, whether individuals, computational components, and/or a combination thereof. The sessions can be media-independent, focused discussions based on factors such as business rules, customer characteristics, agent skill groups, and awareness of current contact center conditions.

In one embodiment, a method of servicing customers' communications in a customer contact center (which distributes customers' communications for servicing among resources based on skills needed by the communications and possessed by the resources) includes the steps of:

(a) collecting first customer information about a first customer communicating with the contact center (e.g., the first customer's network address or telephone number, profile, media type used by the first customer, browser state (cookies), click stream, etc.);

(b) collecting first contact center information (e.g., queue wait times, agent split/skill information, agent availability, multi-cast session state, business policies or state, etc.); and (c) identifying, based on the first customer and contact center information, at least one multi-customer session or chat of interest to the first customer;

(d) presenting the first customer with the opportunity to participate in the multi-customer session; and (e) when the first customer elects to participate in the multi-customer session, connecting the first customer with the at least one multi-customer session.

The session can have a variety of configurations. Examples include informal sessions in which participants are aware of each other and can broadcast and receive messages to/from participants; consultation sessions in which participants are aware of each other but the moderator controls which messages are broadcast to which participant, and classroom sessions in which the moderator leads a discussion or lecture and broadcasts to participants and determines whether a participant can broadcast a message to one or more other participants.

The session can be multi-mode or single mode and can involve multiple communication pathways (both internal and external to the contact center). As used herein, "mode" refers to a communication technique or method as defined, governed, or enabled by one or more selected protocols (e.g., a packet-based protocol such as TCP/IP, RTP, and RTCP, anasynchronous transfer mode protocol, and a frame relay protocol), algorithms (e.g., software applications, such as E-mail, Web browsers, instant messaging, text chat, Integrated Services Digital Network or ISDN, QSIG, DPNSS, SIP, H.323, VDP, and SGCP, etc.) switches or routers, and/or communication medium (e.g., twisted wire, coaxial cable, fiber optic cable, wireless, cellular, and PCS™ of U.S. Sprint). As will be appreciated, language can be considered to be a mode attribute. For example, voice-only wired telephone communications over the PSTN represent one mode, voice-over-IP telephony yet another mode, voice-only wireless telephone communications a further mode, non-voice IP telephony (e.g., a text web chat) a further mode, multi-media telephony (e.g., a video call) over the PSTN a further mode, instant messaging over the data network a further mode, a Web conference over the Internet a further mode, etc.

In one configuration, the session is single mode and the method includes the steps of:

determining whether at least one resource (e.g., a human and/or automated resource, an IVR port and other types of ports, etc.) is available for a first skill and a first mode;

when at least one resource is available, identifying customers corresponding to the first skill and mode; and when a plurality of customers need the first skill and share the first mode, connecting the plurality of customers for servicing simultaneously to the resource having the first skill.

The sessions are typically related to a specific topic or need(s). In one configuration, the communication system identifies first and second sets of customers having first and second needs, respectively; identifies first and second resources having first and second skills, wherein the first and second skills correspond to the first and second needs, respectively; and connects the first set of customers simultaneously with the first resource and the second set of customers simultaneously with the second resource.

The communication system can be continuously or discontinuously creating and operating sessions. In one configuration, the communication system determines whether a session or conferencing state exists for the customer contact center and when the session state exists, connects a plurality of communications for servicing simultaneously to a resource having a first skill, when the plurality of communications need the first skill.

In another embodiment, an intelligent, automated personal agent service function for a communication system is provided. The service function can assist customers by presenting service options (e.g., waiting in a queue, waiting for a particular agent, joining a multi-customer session, using self service, discussing customer needs with another enqueued customer, and selecting a call back) to the customer and/or responding to customer requests and instructions, collecting customer information for use by the contact center, and/or providing services to the customer. Using the resulting knowledge or awareness of the current situation obtained from the customer context, customer presence, and availability of resources, the service agent function applies predetermined rules to filter through a large number of possible service options and provides a much smaller number of service options for the customer to choose from. As used herein, customer "context" refers to circumstances surrounding the present contact of the customer with the communications system 100 (e.g., the contacting modality employed, time of day, state of system, mix of other contacts, language, time of last contact, nature of last contact and service, and service level), and "presence" to other types of information associated with the customer (e.g., customer identity, degree of anonymity of customer, where the customer is contacting the contact center from, customer transactional history, customer needs and preferences, customer profile, and customer interaction with the contact center in the present contact (such as what parts of contact center are visited).

In yet another embodiment, a mood detector is used to monitor customer behavior and/or emotional state. If predefined criteria are detected, the communications system can take appropriate action(s) to address customer needs. The mood detector is particularly effective when used with the service agent function.

The present invention can offer a number of benefits compared to conventional contact centers. The contact center of the present invention can more effectively use queue time and resources, especially during high volume periods, by using parallel communication and only one resource to exchange desired information and/or resolve customer issues. This approach permits a resource to address an issue once instead of having a resource deal with the same issue separately for a number of customers. The contact center of the present invention can have a reduced number of redundant resources (such as agents) and lower operating costs while still providing a lower mean time to issue resolution for customers and maintaining high (and typically higher) levels of customer satisfaction. The methodology can address not only needs of the contact center but also needs of customers. Such individualized service can provide high levels of customer satisfaction for a larger cross section of customers.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Contact Center

Figure 1:
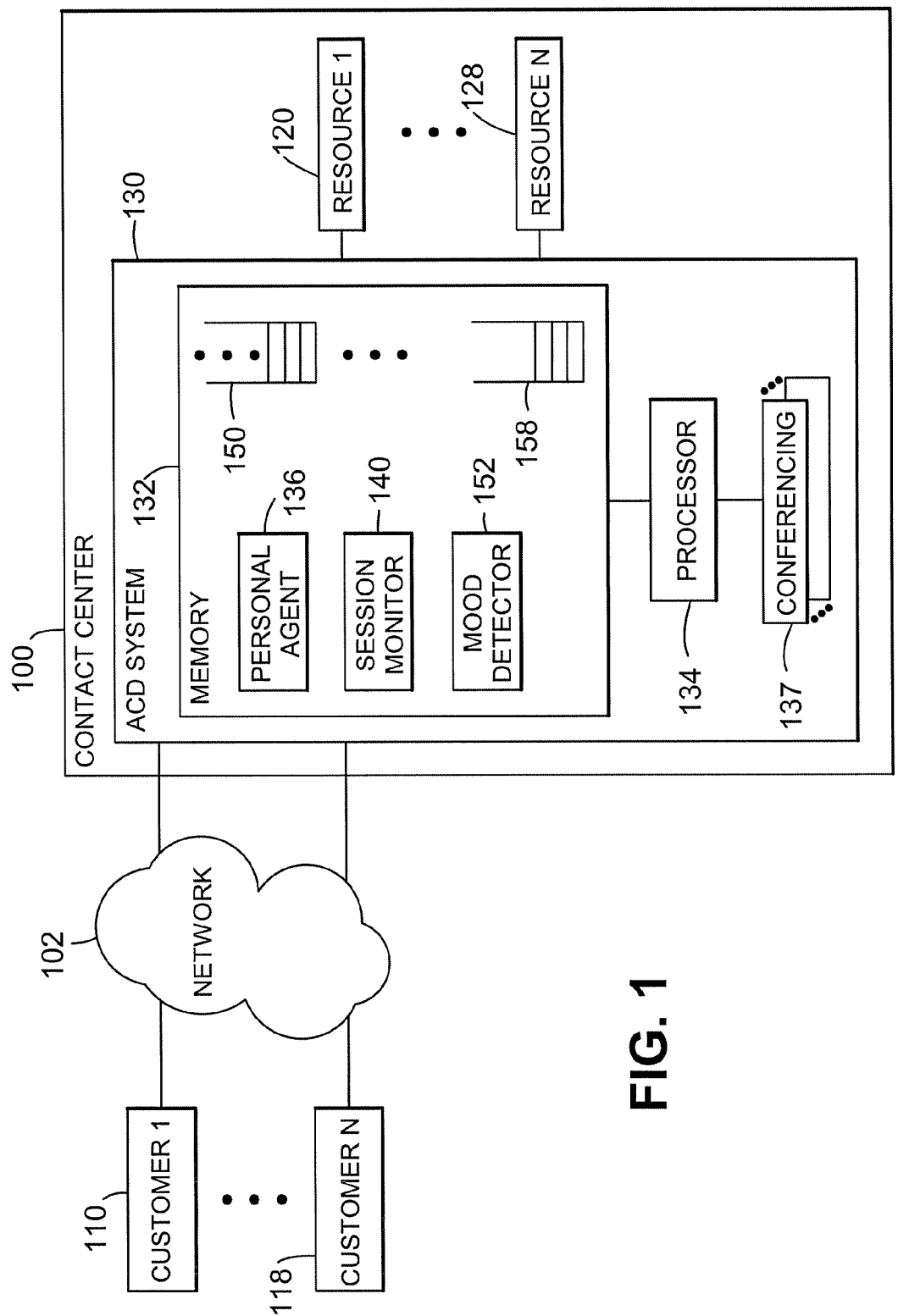
FIG. 1 is a block diagram of a communications system that includes a first illustrative embodiment of the invention.

FIG. 1 shows a communication system comprising contact center 100 that is connected with a plurality of customers 1-N 110-118 via a communications network 102. Illustratively, customers 1-N comprise the customers' communication terminals, such as (wired or wireless) telephones, telephony-enabled personal computers, and personal digital assistant or PDAs, Internet appliances with or without voice-enablement, pagers, and network 102 comprises the public telephone network, a data network such as the Internet, or a combination of the foregoing.

Contact center 100 comprises a plurality of resources 1-N 120-128 for servicing customer contacts, such as human agents, automated agents, IVR ports, and other types of ports, etc., that are connected to network 102 by an ACD (or contact distribution) system 130. Customer communications can be submitted using interactive media formats. Interactive media formats include telephone calls, sending facsimiles, sending E-mail, looking at web pages, requesting live help from a web page, and the like. Live help may include live text, synchronous web pages, voice, video, application sharing, and/or white boarding.

ACD system 130 distributes communications of customers 1-N among, and connects customers' communications to, resources 1-N for servicing. Customers are typically placed in queues 150-158 when no resources are available. ACD system 130 is a stored-program-controlled machine comprising at least one memory 132 for storing control programs and data and a processor 134 for executing programs and using data from memory 132. ACD system 130 is illustratively the DEFINITY™ enterprise communications system of Avaya Inc., and includes one or more conferencing functions 137, such as conference circuits, conference software, and/or multi-point conferencing unit (MCU).

Conferencing functions 137, under the direction of the session monitor 140 (discussed below), provide batch service by connecting simultaneously a plurality of customers to one resource and/or to each other. The resource can be a human agent or an automated program such as an IVR port or E-mail auto response, or even a null resource (e.g., a conference connection between customers 11-18 only, with the customers acting as each others' resources). In one configuration, the resources are human agents having user interfaces that can present information about customers and other information. Each queue 150-158 can have zero or more customers associated with it.

The connection among the batch of customers and the resource can be configured in a variety of ways such as listen-talk, or listen-only, or listen-only/then listen-talk. The customers may or may not have awareness of other participants. For example, informal sessions can be conducted in which all participants are aware of one another and can freely broadcast and receive messages to/from all participants. Consultation sessions can be conducted in which all participants are aware of one another but the resource controls which messages are broadcast to all participants. Classroom sessions can be conducted in which the resource leads a discussion or lecture and broadcasts to all participants. Participants must get approval from the moderator to broadcast a message to all participants. For example, participants must transmit a signal to the moderator requesting permission to ask a question. A visual or audio notice could appear on the moderator's work station when the signal is received. Permission could be granted based upon any suitable criteria, such as the order in which the signals are received, the positions of the requesters in the queue, and the like. Permission can be conveyed by any suitable technique such as text, URL, or E-mail. In another configuration (which resembles a token ring network), the chat participants sequentially receive a token which entitles them to ask a question of the moderator. In any of the foregoing, one or more of the customers can be muted by the resource while other customers are not muted.

The multi-customer session can be configured in a variety of ways. The conference connection with the plurality of customers can be established immediately at the start of the resource commencing to provide service. The resource may start providing service to only one or some of the customers and the other customers may be conferenced in later. Alternatively, the batch of customers can first be conferenced together before the resource is conferenced in. The conference connection can also be ongoing, with new customers being conferenced in as previously-conferenced customers drop out.

The services that may be provided via batch service are varied. For example, customers may listen to various types of information, such as the latest interest rates, stock market quotes, investment recommendations, music offerings, product descriptions, etc., or participate in sponsored activities, such as solo or multi-party games that may involve other enqueued customers. In a listen-and-talk connection, the conferenced customers may then discuss the received information with each other or ask questions of the resource. Illustratively, one or more of the customers themselves can function as the resource and answer questions or provide further information.

The Personal Agent

According to a first embodiment of the present invention, a personal agent function 136 is employed (alone or with multi-customer sessions) to provide an intelligent, automated personal assistant for each customer 1-N. The personal agent function 136 collects dynamic and static data to provide an awareness of the contact and current situation based on context, presence, and availability of resources and makes decisions based on this data and predetermined service, agent retention, promotional, and/or business (e.g., bottom line) goals, policies and rules. "Customer awareness" refers to information associated with the customer, such as the auditory and visual inputs characteristic to the contact mode, customer identity, customer transactional or service history, customer needs and preferences, customer profile, customer media personalization of user configurable parameters (e.g., hold music selected, background color selected, etc.) and customer interaction with the contact center in the present contact (such as what parts of contact center are visited), and customer context, and "contact center awareness" to information associated with the contact center(s), such as the quantification of the system (contact center) state, current CRM (Customer Resource Management) configuration, queue sizes and wait times (both on-line and telephony queues), presence and availability (workloads) of resources and skills, success rate for self-service alternatives, current chats, start times of various activities, call back times, agent's schedules, emergency status, and unusual events impacting the contact center. After a customer or contactor initially contacts the contact center 100 (or walks through the virtual door into the center 100), the personal agent function 136 determines the potential impact of the customer on these goals, what promotions and products or services the client is interested in hearing about based on extensive use of the customer's history/profile, the current CRM configuration, the current contact center situation, business policies, pool of contacts, the customer's recent history, preferred resource and method of service, and the relative success rates of customer service methods or options.

Using this information and following applicable business goals, policies and/or rules (examples of which are presented below), the personal agent function 136 determines for a selected customer 2 to 3 service options from among a greater number of service options and can recommend to the selected customer one of the options. In this manner, the personal agent function limits service options to those service options which most efficiently utilize resources while effectively servicing the customer.

The personal agent function 136 is typically software instructions stored in memory 132 of the ACD system 130 or can be configured as a hardware implementation such as an Application Specific Integrated Circuit or ASIC.

The interface of the agent with the customer can take any suitable form. In a voice contact such as a telephone call, the agent function can be a voice. In a contact through a graphical user interface such as a contact through a data network, the agent function can be in the form of an animated character. The animated character can communicate with the customer through text, voice, animated movement or a combination of these communication techniques. If the customer contact is initiated via an intelligent device, such as a personal digital assistant or PDA, a cell phone, a personal computer and the like, all or part of the agent function 136 can be downloaded (e.g., as an applet) onto the customer's device. The downloaded software can gather information stored in the customer's device and provide the information to the agent function stored in memory 132.

Figure 2:
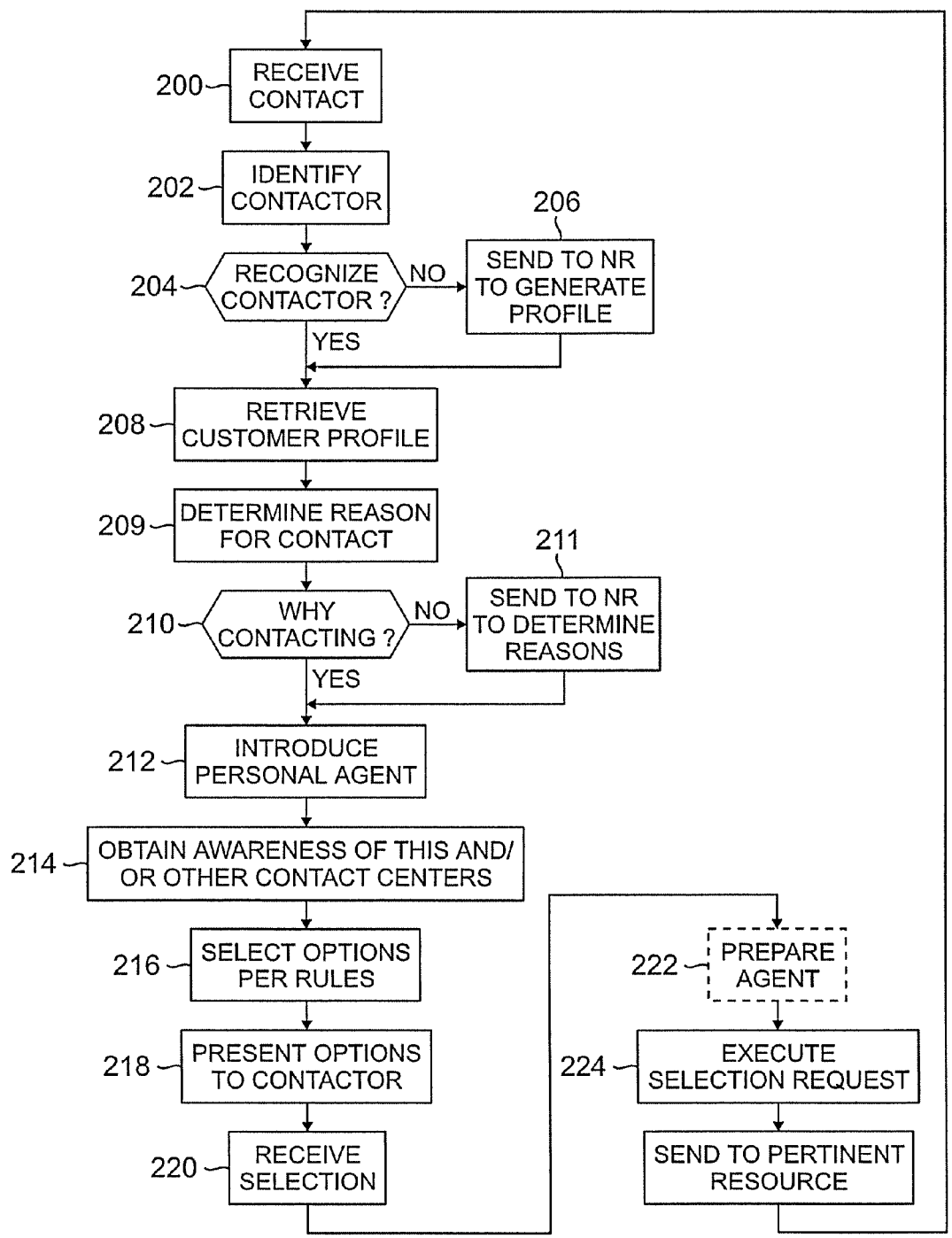
FIG. 2 is a flow diagram of operation of a personal agent function of the system of FIG. 1.

The operation of the agent service function is depicted in FIG. 2.

Referring to FIG. 2, execution of the agent service function is invoked when a contact is received in step 200. As noted, the contact can be received via any suitable type of communication medium. Examples include via the public switched telephone network (such as by a wired telephone), a private branch exchange or PBX, a wireless telephone network (such as by a wireless telephone), and a data network (such as the Internet). The contact can also be via any suitable type of communication mode.

In step 202, the agent service function collects information to identify the customer. The information collected surrounds the context of the contact. For example, the agent service function can identify the customer by telephone number, network address, cookie, voice recognition techniques, prior registration, unique keyword or identifier, and ii digit.

In step 204, the agent service function determines whether, based on the information collected in step 202, the agent service function has first predetermined types of information regarding the customer stored in memory 132. In one configuration, the customer is considered to be recognized if a customer profile of the customer is stored in memory 132.

If the agent service function lacks some or all of the first predetermined types of information, the customer is automatically sent in step 206 to an IVR port for the lacking information to be collected. When the IVR questions have been answered satisfactorily, the agent service function proceeds to step 208.

If the agent service function has the first predetermined types of information, the agent service function in step 208 retrieves the information such as a customer profile from memory 132.

In step 209, the agent service function determines the reason for the customer contacting the contact center. As will be appreciated, the purpose(s) of the contact is normally crucial information in knowing which options to present to the customer. This step is usually performed by reviewing the customer awareness information previously gathered (e.g., DNIS or URL, customer profile, and recent history) and/or prompting the customer for the purpose(s) of the contact.

In decision diamond 210, the agent service function determines whether the purpose(s) for the contact have been determined in step 209. If purpose(s) is known, the agent service function proceeds to step 212. If purpose(s) is unknown, the agent service function proceeds to step 211, and the IVR prompts the customer for the information. After obtaining the information, the agent service function proceeds to step 212.

In one configuration not shown in FIG. 2, the agent service function, in step 209 and 210, reviews the retrieved information and determines whether the information is complete (or includes second predetermined types of information). Such additional information (or customer awareness) is required to determine the customer's purpose for the current contact (or the customer's need(s)). If the information is not complete, the agent service function repeats step 211 until the information has been obtained.

In step 212, the personal agent interface is introduced to the customer (or greets the customer). As will be appreciated, for audio-only communications the introduction can be done by a voice associated with the personal agent. For example, the voice can say to the customer "I will be your automated personal agent today." For visual or audio/visual communications, the introduction could incorporate introducing an animated character on the graphical user interface. Different voices or animation can be used based on the age, sex, and ethnicity of the customer.

In step 214, the agent service function collects information or awareness respecting the subject contact center and/or other contact centers. Such information includes resource availability such as expected wait times for queues (both on-line and telephony queues), server workloads, IVR port availability, skill/staffing levels (e.g., availability and workloads of particular agents), current sessions or chats and the identities of the chat participants, start times of various activities, vacancies in current chat sessions, call back times, agents' schedules, unusual events impacting customer service such as bad weather queue expected wait times, success rate for self-service alternatives, the current CRM (Customer Resource Management) configuration, and the relative success rates of customer service methods or options (which can be used to order choices or options presented by the personal agent function 136 to the customer).

Using the awarenesses of the customer and the contact center(s) and predetermined rules, the agent service function in step 216 selects one or more service options from among a plurality of options to present to the customer. Typically, a matrix of service options and business rules is employed in selecting the most desirable options for the customer. Examples of service options include waiting in a queue for a resource, waiting for a particular (human) agent, joining a chat or other group service, using self-service, browsing a Web site or otherwise collecting information from a server, scheduling an agent connection at a later time, switching over to other media, and/or selecting a call back.

If the client opts to wait in a queue 150-158, the personal agent can make recommendations for activities to participate in while waiting for service. These activities can range from participating in a user group discussion or chat session, hearing about a promotion, taking a survey, trialing a new user interface, giving product feedback, playing games with other customers for discounts or to advance the customer's queue position, and browsing, and chattering with another enqueued customer.

The rules typically reflect predetermined service, agent retention, promotional, and/or business (e.g., bottom line) goals or policies, call center awareness, and customer awareness. Rules can be used to determine not only what options to present to the customer but also what additional questions to ask the customer to more effectively filter through the possible options for the customer. Examples of business rules include:

(a) if the expected wait time in a queue for a resource exceeds a predetermined time interval, presenting self-service or a chat and holding the customer's queue position as an option, (b) if a pertinent chat is in session or is scheduled to be session within a predetermined time period, presenting participation in the chat as an option, (c) if the expected wait time in a queue for a customer in a queue for a resource exceeds a predetermined time interval, presenting participation in a survey for some form of compensation such as a coupon as an option, (d) if the expected wait time in a queue for a resource exceeds a predetermined time interval, presenting participation in a one or more player games as an option, (e) if the customer has terminated a contact a predetermined number of times over a selected time interval when presented with self-service or a chat, not presenting self-service or a chat as an option, (f) if the customer recently spoke to an agent who will not be available for a predetermined amount of time, presenting the customer with a call back option, (g) if the customer's business value is low, presenting the customer only with low-cost service options, (h) if the customer is behind on payments, not presenting the customer with self-service options, and (i) if the customer is unhappy with the business associated with the contact center, not presenting the customer with conferencing options. Other business rule examples include or are derived from agent rotation rules, profitability goals, business goals, and customer loyalty.

In step 218, the agent service function presents the selected options to the customer. As noted, the presented options can include a recommendation by the agent service function of a specific option that would best service the customer.

In steps 220 and 224, the agent service function receives the option selection from the customer and executes the option. In optional step 222, the execution could include preparing a resource, such as a human agent, for interaction with the customer. In other words, the agent service function provides to the human agent pertinent information collected by the agent service function's interaction with the customer. This could be done via a screen pop or VDN of origin announcement In step 226, the agent service function forwards the customer to the pertinent resource. For example, in step 226 a simplex or duplex communication pathway is configured between the customer and the pertinent resource.

The agent service function can continue to monitor passively or interactively the customer after the selected option is executed. In one configuration, the agent service function monitors the behavior of the customer in the contact center, particularly when the contact center is a Web site. For instance, the agent service function can track what parts of the Web site are being visited (or what information is being reviewed or collected) by the customer prior to or while waiting in a queue for a resource. This information can be used by the resource to provide a higher quality of service to the customer. The agent service function can also update the customer's records in memory 132 to reflect any such collected information. Such information can be used by the contact center to provide a higher quality of service to the customer in subsequent contacts.

In one configuration, the agent service function continues to monitor the customer and, under certain circumstances, (again) presents the same or different options to the customer. This configuration is depicted in FIG. 3.

Figure 3:
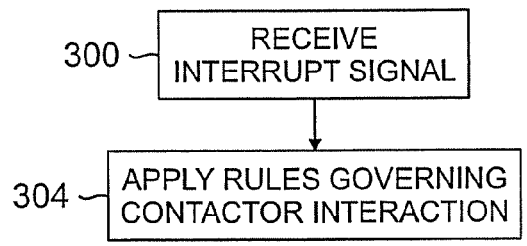
FIG. 3 is a flow diagram of operation of a personal agent function of the system of FIG. 1.

Referring to FIG. 3, in step 300 an interrupt signal is received by the agent service function. The signal can, for example, be initiated by the customer by pressing a button on a touch tone telephone, clicking on an icon on a GUI, and the like. The signal can also be initiated by the contact center itself. For example, when agent availability changes the contact center waits to present now options to the customer. In another example, a mood or emotion detector 152 can monitor, particularly in voice communications, a physical parameter such as a breathing interval or voice (decibel) level and/or words spoken by the customer. If a physical parameter has a predetermined relationship with a selected threshold or one or more predetermined words is/are detected, the detection device/software can generate an interrupt signal to the agent service function. The mood or emotion detector can be any suitable device for monitoring the desired physical parameter or voice communications. For example, the words can be monitored using conventional voice recognition software. The servicing resource itself can also generate the interrupt signal, such as when the customer/resource interaction is going nowhere.

When an interrupt signal is received, the agent service function in step 304 applies predetermined rules governing customer interaction to present further options and/or questions to the customer. The rules can include any of the rules mentioned above or other rules depending on the application. For example, depending on the source of the interrupt signal the agent service function can provide an alert to the human agent.

The interrupt routine can have numerous beneficial applications. For example, the customer can continue to communicate with the personal assistant even while being serviced by a resource, such as a human agent. The customer could generate a signal or otherwise communicate with the agent service function in the event that the service being received is unacceptable. The communication can be private in the sense that the communication is not shared with the resource serving the customer.

Topical Dynamic Chats

As noted, one of the options that the personal agent service function can present to customers is the opportunity to participate in a topical dynamic chat or multi-customer session. Topical dynamic chats are created by the session monitor 140 on a topic-by-topic basis to service batches of customers interested in a common topic associated with queues 150-158. The multi-customer chat or session can be configured dynamically based on initial and/or ongoing customer input. If the number of customers for a particular topic reaches an administered threshold, a resource is assigned to a chat, and all the applicable customers will be given the option of joining the chat via their respective communication mode.

The session monitor 140 can take advantage of Topic Tree content analysis methodologies to allocate customers into a specific chat. The allocation criteria can take many forms. For example, customers can choose from specific lists of topics, analyzing the path the customer used to reach the queue and allocating them based on that path, value-oriented approaches such as discussed in copending U.S. application Ser. No. 09/756,955, or mapping the customer's version of the topic or need(s) to a predefined list of topics. The agent service function 136 typically collects information useful in identifying whether or not a customer is eligible for a chat.

The customer can indicate sometime after initiating contact with the contact center whether he is willing to participate in a chat (or topical dynamic chat) in the event that one will be offered related to the topic for which he or she is calling. The customer can further indicate how he or she would like to be notified when and if a chat (or topical dynamic chat) is formed. The notification by or at the instruction of the session monitor can take many forms, including without limitation an visual or audio notice, an instant message, an E-mail message, an outbound call, a short message service or SMS, page, and Web Post Office Protocol or POP. If the chat (or topical dynamic chat) is to be offered at a later time, the customer could be given a unique access code to enter the chat automatically upon entry of the code. Alternatively, the resource may contact the customer at the scheduled time. A customer that is interested in the chat (or topical dynamic chat) but elects not to participate can request a transcript of the chat or information presented in the chat (or topical dynamic chat), which can be forwarded to him by any suitable technique, such as those set forth previously.

The session connection can take numerous forms occur in a number of modes. For example, the resource can talk to the customer via telephone, video call, or IP telephony, responding to a facsimile or E-mail, talking to the customer via a web-based text chat, sending web pages or other documents to the customer, sharing a web page or application that both customer and resource are accessing simultaneously, and sharing applications. In these connections, the resource can use a mode translation, e.g., converting a text message to voice, translating French text into German, etc.

Figure 4:
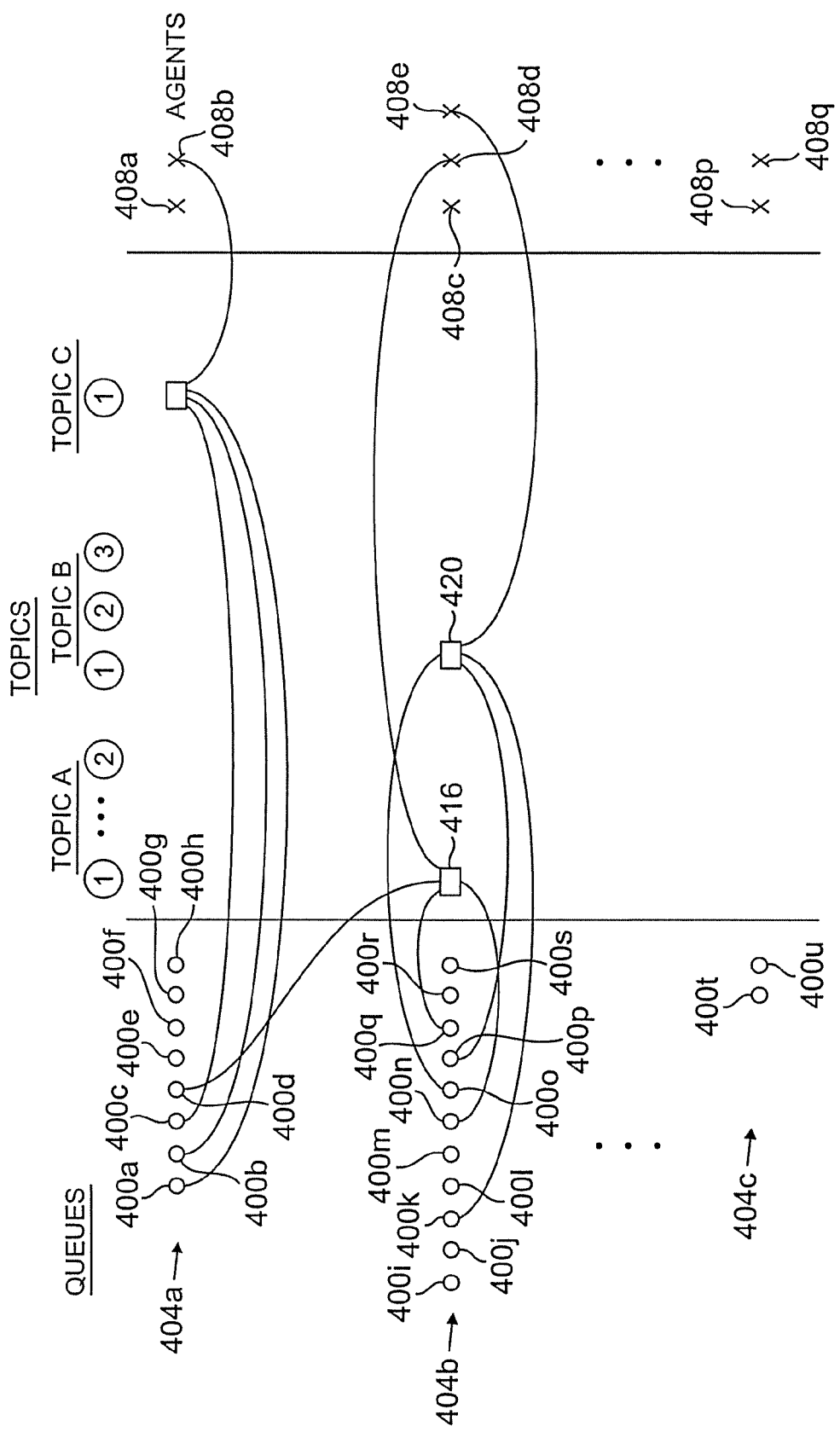
FIG. 4 is a block diagram of a plurality of concurrent sessions in the communications system according to a second illustrative embodiment.

FIG. 4 illustrates the use of topical dynamic chats in a typical contact center. Customers 400a-k are placed in queues 404a-c. Each enqueued customer has attributes that are inputs to chat placement, e.g., hold music selection, click stream, etc. The customers in each queue require common skills and needs are assigned to agents 408a-b (for queue 404a), 408c-e (for queue 404b), and 408f (for queue 404c) having the necessary skills. Within a given queue, customers typically have a myriad of needs that generally relate to a multiplicity of topics. In some applications, customers in different queues have common needs and/or needs that relate to common topics.

For purposes of the example, the contact center is assumed to represent a large sporting goods retailer. Topic A is bikes, topic B backpacks, and topic C footwear. Customers in the various queues 404a-c have questions relating to one or more of these topics. Chats for topic A can be provided for contact mode type 1 (e.g., telephone) and 2 (e.g., non-voice Web access), for topic B can be provided for contact mode types 1, 2 and 3 (e.g., Voice over IP), and for topic C can be provided only for contact mode type 1. Through the agent service function or the nature of the queues themselves, customers 400a-d have been offered the opportunity to participate by telephone in a chat 412 administered by agent 408b related to Topic C. Customers 400a-c have elected to participate in the chat. Meanwhile, customers 400d, e and p-r have been offered the opportunity to participate by telephone in chat 416 administered by agent 408d related to Topic A. Customers 400 d, p, and r have elected to participate in the chat. Finally, customers 400k, n and 0 have been required to participate in chat 420 administered by agent 400e. The waiting time for customers 400t-u is too short or the number of eligible participants too small for a chat to be useful. Although FIG. 4 shows single mode sessions, it is to be appreciated that the chats can be conducted through one or more suitable contact modes, including those identified previously. For example, the agent's actions and/or presentation can be multi-mode in the delivery.

Customers typically participate in the chat until the customer receives enough resolution to end his/her call, the customer's place in the queue is reached and the customer decides to deal with an agent on a one-on-one basis or the customer chooses to abandon the chat and return to his or her position in the queue. If the customer feels that he or she is getting the necessary resolution in the chat, the customer can choose to either renounce or delay his or her position in the queue and remain in the chat.

An illustrative embodiment of the operation of the session monitor 140 will now be discussed with reference to FIG. 5. As will be appreciated, the session monitor 140 is typically implemented as software instructions stored in memory 132 or as a hardware implementation such as an ASIC.

Figure 5:
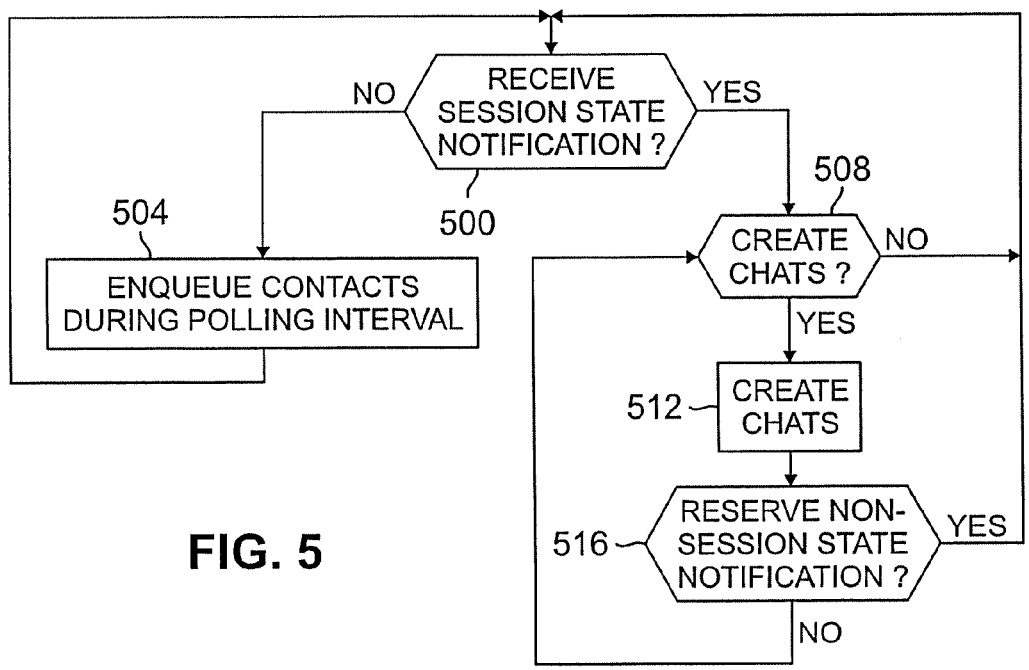
FIG. 5 is a flow diagram of operation of a session monitor of the system of FIG. 1.

Referring now to FIG. 5, in step 500 the session monitor 140 determines if it has received a session or conferencing state or request notification. The session state notification can be triggered by a number of different events and be reflective of a number of different call center states. For example, the session state notification could be triggered for a particular queue (or topic) or the call center as a whole when expected wait times exceed a predetermined level, the population or size of the queue (or topic) exceeds a predetermined threshold, when a predetermined arrival event occurs, and/or staffing levels (for a skill or the call center as a whole) fall below a predetermined level. The session can be mandatory and/or unannounced, e.g., a "lobby" welcome and redirect informal session that a customer enters when he contacts the contact center. Other business reasons may warrant a session state notification to be generated, such as a defined queue handling routine to enforce a business policy or method.

If a session state notification is not received, the session monitor remains inactive and in step 504 the contact center continues to enqueue contacts during a predetermined polling interval. At the end of the polling interval, the session monitor repeats step 500. As will be appreciated, the session monitor can continuously repeat step 500.

If a session state notification is received, the session monitor in step 508 determines if there are a sufficient number of candidates or trained resources to create a chat. This determination is made by examining not only the customer profiles and/or responses of the enqueued customers but also the communication mode(s) associated with the customers, the availability and skills of suitable host resources to offer the chat, and business policies and/or methods. This step is discussed below in more detail with reference to FIG. 6.

If the minimum number of candidates or a host resource are not identified, the session monitor returns to step 500.

If the minimum number of candidates or a host resource are identified, the session monitor in step 512 creates or sets up the chat by suitable techniques. One method of setting up the chats or sessions is discussed below with reference to steps 616, 620, 624, and 628 of FIG. 6. In step 516, the session monitor determines if a non-session state notification (or return-to-normal notification) has been received. If so, the session monitor releases all chat resources and returns to step 500. If not, the session monitor repeats step 508 (or waits a polling interval and returns to step 516 (not shown)).

Although FIG. 5 shows the use of a session state notification to trigger execution of the session monitor 140, it is to be appreciated that the session monitor 140 can be triggered by another event or be in constant operation regardless of the state of the contact center. In the latter case, the session monitor can be creating continuously chats or identifying possible chats in the event a session state notification is received.

Figure 6:
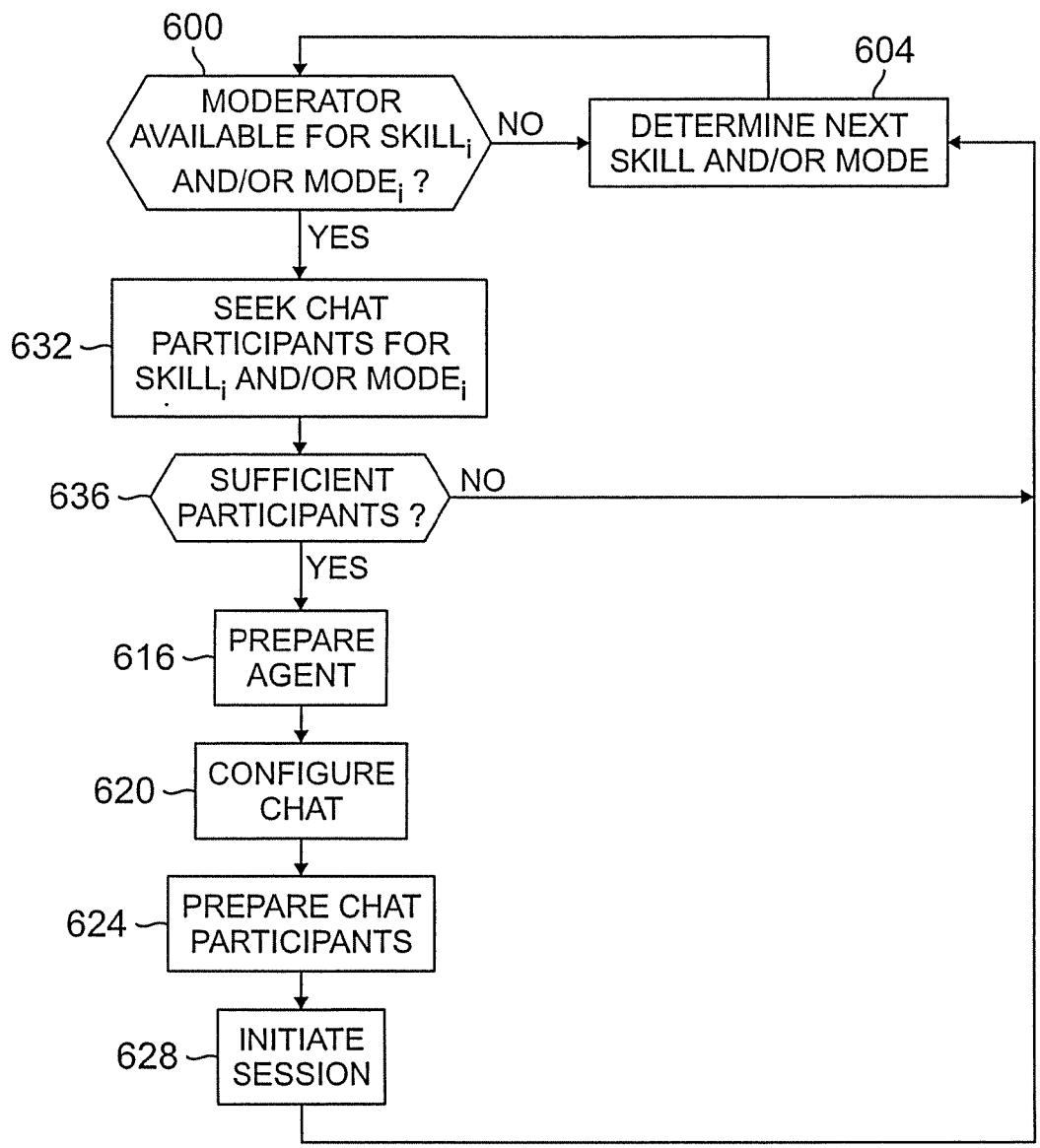
FIG. 6 is a flow diagram of operation of a session monitor of the system of FIG. 1.

FIG. 6 shows the algorithm used to identify candidate chats.

In step 600, the session monitor first determines whether a moderator (or resource) is available for skill$_i$ and/or mode$_j$. If no moderator is available, the session monitor proceeds to step 604, in which the next skill and/or mode is identified, and thereafter repeats step 600 using the next skill and/or mode. If a moderator is identified, the session monitor proceeds to step 632. In some applications, a moderator may not be required.

The session monitor in step 632 seeks chat participants for the subject skill and mode. This can be done by the agent service function 136 as discussed above.

In step 636, the session monitor determines if there are sufficient participants for the chat. If not, the session monitor returns to step 604. If so, the session monitor proceeds to step 616.

The session monitor prepares the agent or moderator in step 616. This step can be performed by agent service function 136. The agent or moderator is typically provided with pertinent information on each of the chat participants (e.g., the value of each participant to the contact center, the needs of the participant, historical information about the participant, etc.), the chat configuration rules and parameters, script for the chat, and the resource availability of the contact center.

In step 620, the session monitor configures the chat based upon relevant rules regarding chats for the subject skill and mode(s) involved. Examples include the type of chat, such as informal, consultation, or classroom, and whether the chat is closed to new participants. In this step, the chat is physically configured by the conferencing functions 137.

The session monitor prepares chat participants in step 624. This step is typically performed by providing each chat participant with information about the moderator, rules governing communication in the chat, information about other chat participants, and the like.

Finally, in step 628, the session monitor initiates the chat. The session monitor then returns to step 604.

FIG. 6 demonstrates the algorithm for configuring new chats. The algorithms for populating ongoing chats accepting new participants is depicted in FIGS. 7 and 8.

Figure 7:
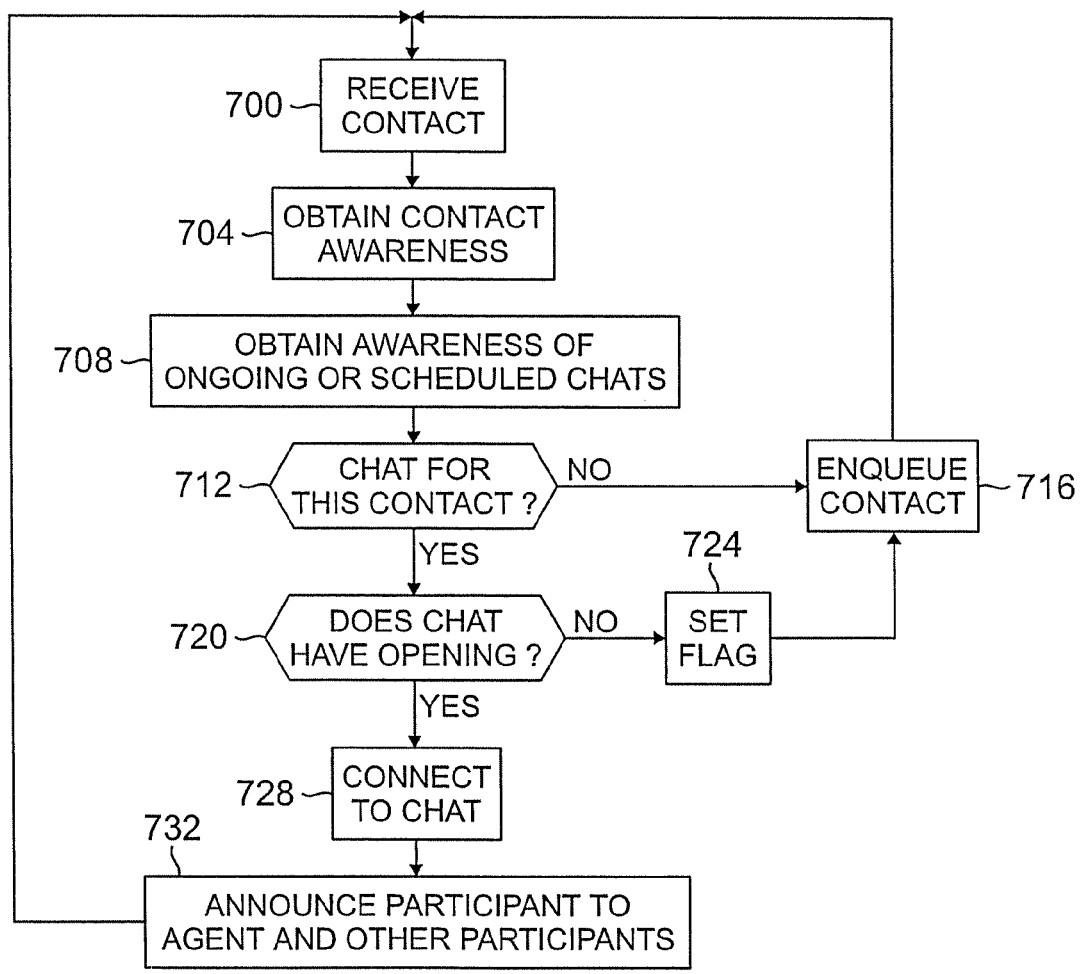
FIG. 7 is a flow diagram of operation of a session monitor of the system of FIG. 1.
Figure 8:
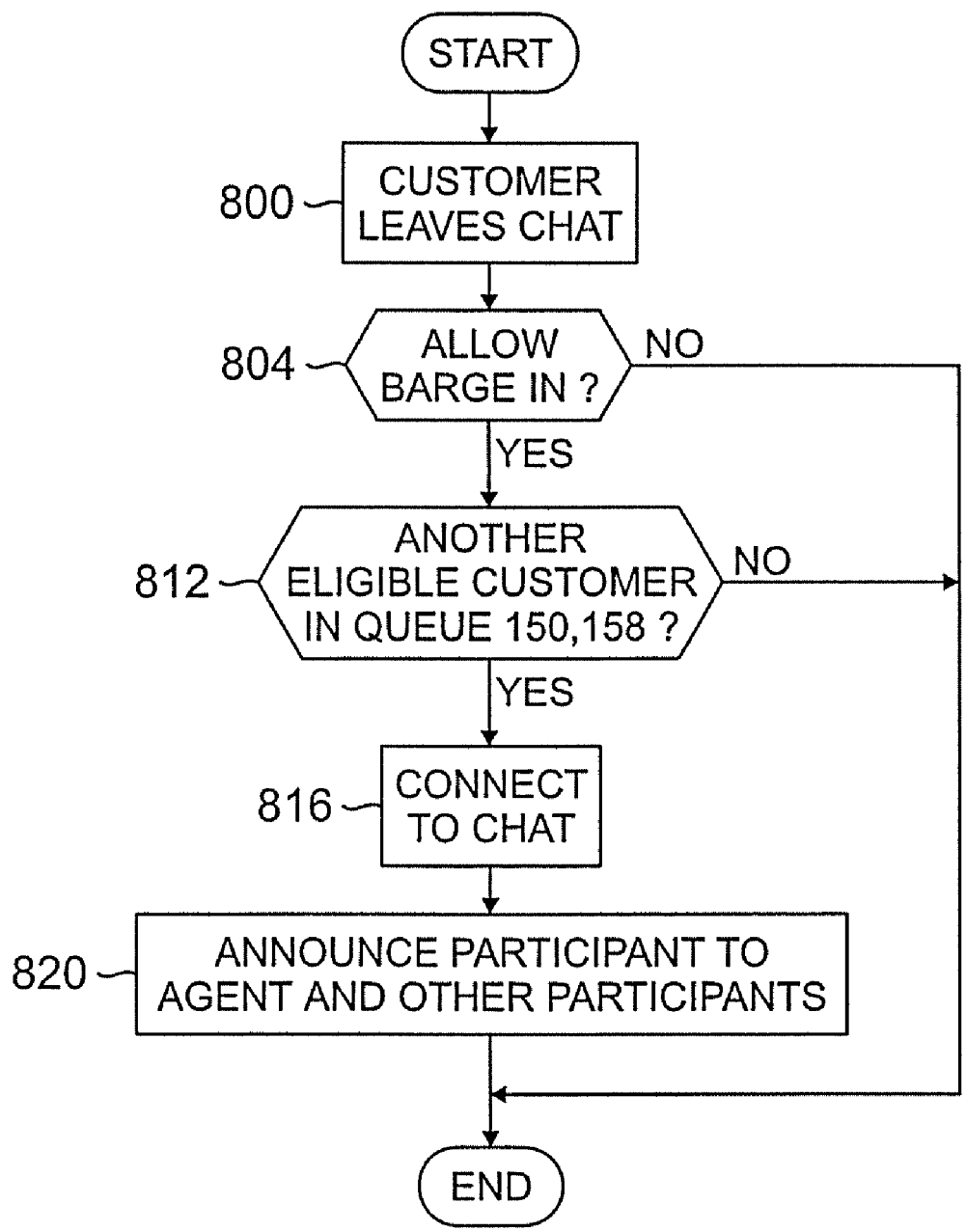
FIG. 8 is a flow diagram of operation of a session monitor of the system of FIG. 1.

Referring now to FIG. 7, in step 700 the contact center receives a new contact.

The session monitor in step 704 obtains awareness or information regarding the contact. This is typically performed by the agent service function 136 as discussed above.

In step 708, the session monitor obtains awareness or information of all ongoing or chats scheduled for a predetermined time period after the contact is made.

In step 712, the session monitor determines if there is an eligible chat for this contact or customer (based for example on skill and/or mode). If there is no eligible chat, the session monitor enqueues the contact in step 716 and returns to step 700. If there is an eligible chat, the session monitor proceeds to step 720.

The session monitor next determines in step 720 if the eligible chat has an opening or vacancy for the customer. If the chat is currently full, the session monitor sets a (vacancy) flag in step 724 and proceeds to step 716. The flag will cause the session monitor to contact the customer in the event that a current chat participant exits the chat and the chat has a vacancy.

If the chat has an opening, the session monitor in step 728 connects the customer to the chat. In step 732, the session monitor announces the participant to the agent and to the other participants in the chat. The session monitor then returns to step 700 to await the next contact.

Referring now to FIG. 8, a customer leaves a chat in step 800. In decision diamond 804, the session monitor determines whether the contact center is configured to allow barge in or another customer to enter the vacated, ongoing chat. If barge in is not allowed, the repopulation algorithm ends in step 808. If barge is allowed, the session monitor, determines in decision diamond 812 whether there is a (previously scheduled or waiting) customer in queue 150, 158 eligible to participate in the chat. If there is not an eligible enqueued customer, the session monitor proceeds to step 808. If there is an eligible enqueued customer, the session monitor, proceeds to step 816 to connect the customer to the chat and then to step 820 to announce and/or introduce the customer to the agent/moderator and other chat participants.

Figure 9:
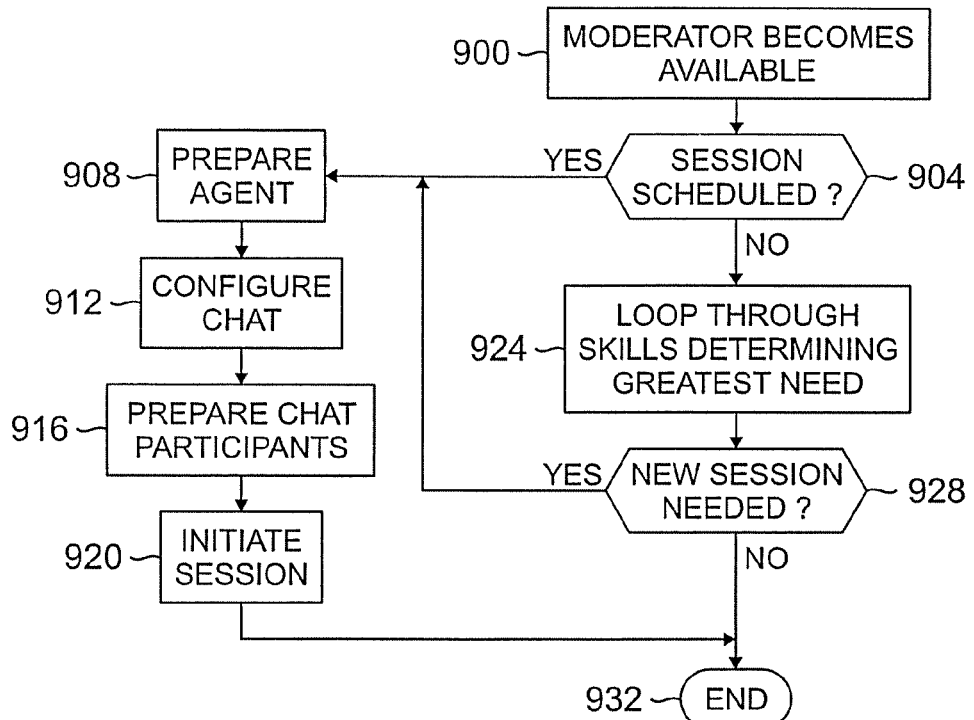
FIG. 9 is a flow diagram of operation of a session monitor of the system of FIG. 1.
Figure 11:
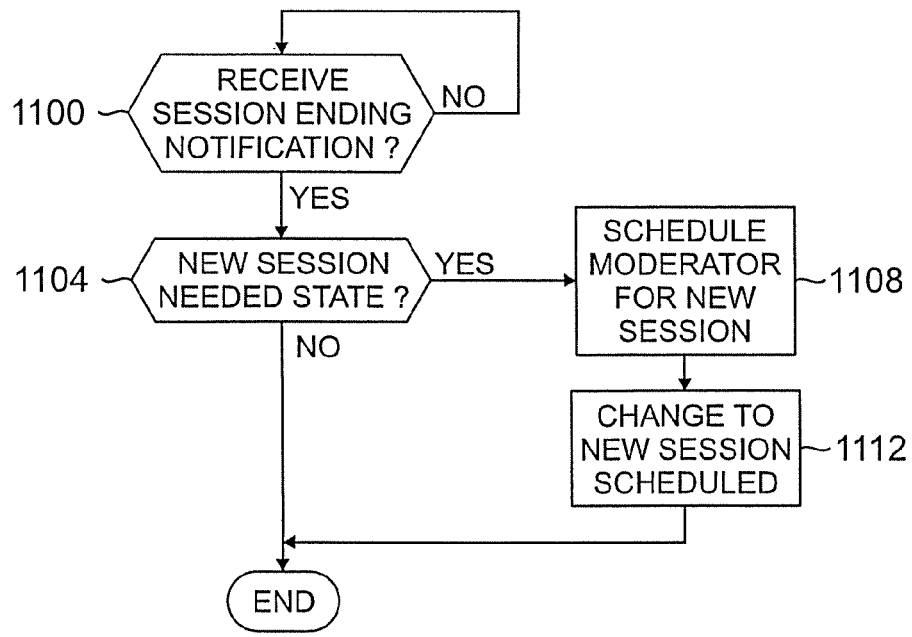
FIGS. 10-11 are flow diagrams of an alternative embodiment of the session monitor.
Figure 10:
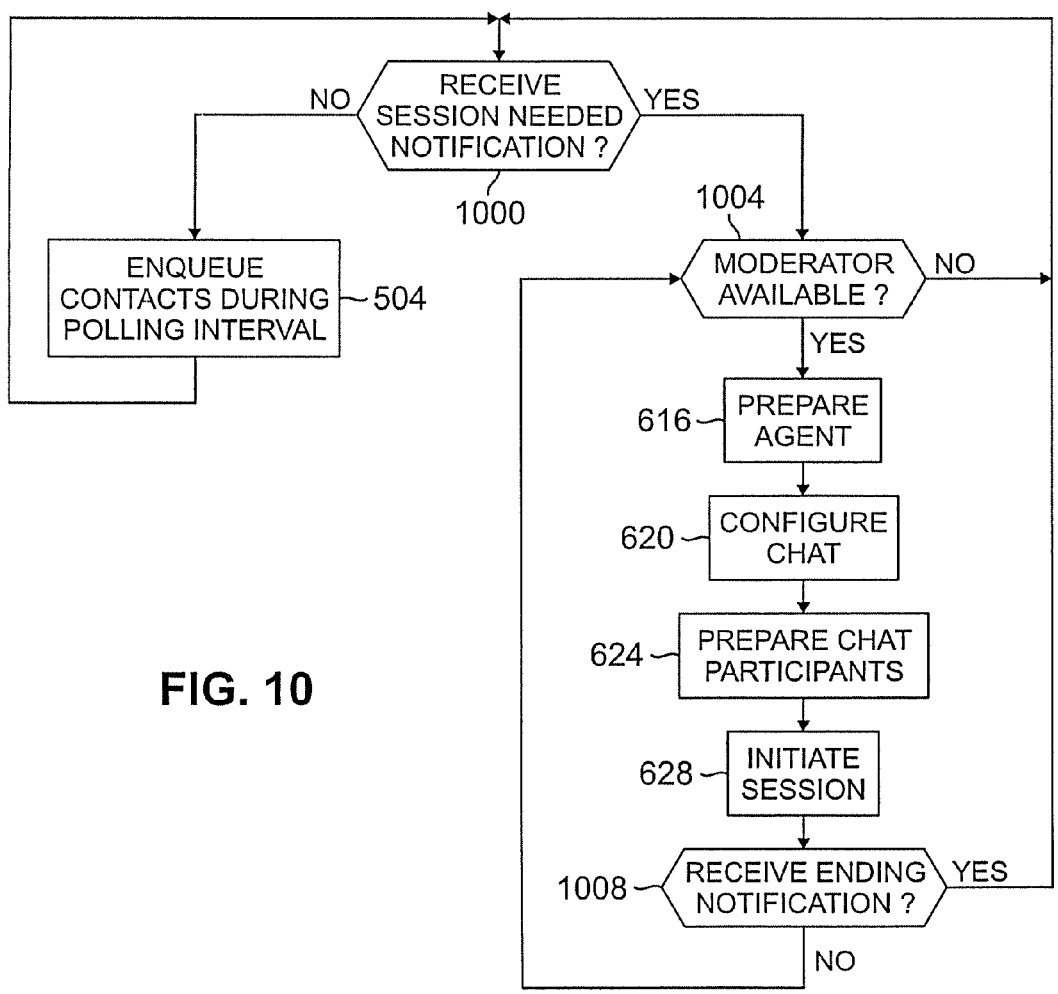

A number of variations and modifications of the invention can be used. It would be possible to provide for some features of the invention without providing others. For example, one alternative embodiment is shown in FIGS. 9-11. In contrast to the embodiment of FIG. 5 which has only two session states, namely Session State and Non—Session State, the embodiment of FIGS. 9-11 has multiple session states, namely In Session—Vacancies State (which indicates that one or more sessions has a vacancy), Session Ending State (which indicates that a session will be ending within a predetermined time period), New Session Scheduled State (which indicates that the session monitor is setting up a session and/or a resource, such as a moderator, is or will be available in a predetermined time period), New Session Needed State (which means a new session is needed but no available resource has yet been identified for the session (other sessions for this skill may or may not exist to be in this state)), and New Session Not Needed State (which means that a new session is not needed). When a new customer arrives and the enabled state is the in session—vacancies state, the customer is added to the appropriate session having the vacancy. When a new customer arrives and the enabled state is the new session scheduled state, the customer is added to a new scheduled session. When a session is scheduled to end, either the new session scheduled or new session not needed state, as appropriate, is enabled. Unlike the embodiment of FIG. 5, one or more of these states can be enabled at any one time depending for example on customer needs and/or call center status. By comparison in the embodiment of FIG. 5, the session state is in existence when the call center status requires sessions to be used and the non-session state is in existence when the call center status does not require sessions to be used. Thus, only one of the session and non-session states are enabled at any one time. With this in mind, the embodiment will now be further discussed with reference to FIGS. 9-11.

FIG. 9 depicts how the session monitor handles the situation when a moderator becomes available due to termination of a chat. Referring to FIG. 9, the session monitor determines in step 900 that a moderator has become available. This can be ascertained by the session monitor receiving an availability indication from the moderator. In step 904, the session monitor determines whether there is a session scheduled for the moderator and if so when the next new session is scheduled.

When a new session is scheduled within a predetermined time period, the session monitor prepares the moderator/agent in step 908, configures the chat in step 912, prepares the chat participants in step 916, and initiates the session in step 920.

When a new session is not scheduled within the predetermined time period, the session monitor in step 924 loops through each skill of the moderator and identifies one or more sessions that the moderator can perform and an associated (assigned or determined) session value variable for each session. The session monitor takes the session having the highest (or lowest depending on the configuration) session (or the session having the highest value to the contact center). The value can be based on any selected factors, including business rules, service level requirements, contact center state, predicted queue wait times, staffing levels, available resources, available skill levels, current populations for the various possible sessions, length of the various possible sessions, contents of the various possible sessions, potential revenue realized from the various possible sessions, etc.

In decision diamond 928, the session monitor determines whether the new session needed state is in existence. When a new session needed state is enabled, the session monitor proceeds to step 908. When the new session needed state is disabled, the session monitor proceeds to step 932 and terminates operation without setting up the session.

FIG. 10 shows the algorithm for setting up sessions as customers contact the contact center. In decision diamond 1000, the session monitor determines whether the session needed state is enabled by determining whether a session needed notification has been received. When the notification has been received (or the session monitor has otherwise determined that the session needed state is enabled), the session monitor in decision diamond 1004 determines whether a moderator having the appropriate skills is available. When a moderator is not available, the session monitor returns to decision diamond 1000, and, when a moderator is available, the session monitor performs steps 616, 620, 624, and 628 (discussed above with reference FIG. 6). After performing these steps, the session monitor determines in decision diamond 1008 whether the new session not needed state is enabled. When the new session not needed state is disabled, the session monitor repeats step 1004 to set up additional sessions, and, when the new session not needed state is enabled, the session monitor returns to step 1000.

FIG. 11 is the algorithm used when a session has ended or will be ending within a predetermined time period. In decision diamond 1100, the session monitor determines that the session ending state is enabled. This can be determined by receiving a session ending notification and/or by polling the appropriate computational component(s). When the session ending state is enabled, the session monitor in decision diamond 1104 determines whether the new session needed state is also enabled. When the new session needed state is enabled, the session monitor schedules a moderator for the new session in step 1108 and enables the new session scheduled state in step 1112 to populate the new session.

In another alternative embodiment, all customers or all customers contacting the contact center with reference to a specific topic can be placed into a group chat or "welcome room". In the welcome room, the customers may or may not have awareness of other customers participating in the chat. Specifically, the welcome room can simply be a one-way broadcast from the contact center or a duplex network configuration in which each customer can both send and receive communications to/from the resource and/or other chat room participants. In another alternative embodiment, chat participants may elect to share with other chat participants some or none of their personal information.

In yet another alternative embodiment, candidates for a chat are given no option about whether or not to participate in the chat. Participation in the chat is mandated by the contact center.

In yet another alternative embodiment, the participants could remain anonymous using security features.

In yet another alternative embodiment, authentication could be required for participants to participate in a session.

In yet another alternative embodiment, a customer can change contact mode or modality during a contact with the contact center. For example, the customer can initially contact the contact center in a text communication through a personal computer, input a keyword, and be converted into instant messaging in a new communication path or channel. In another example, the customer can move from rapid email to a text chat via a hotlink (provided in email). In yet another example, the customer contacts the contact center via an IP phone and later obtains collaboration via a phone display. In all of the above examples, the contact center can manipulate media types associated with customers to increase the size of the eligible pool or population for a particular type of session. In other words, the contact center can convert mode or media types to a common denominator to facilitate a session, e.g., convert text to voice or vice versa.

In yet another embodiment, the session monitor can mix differing contact modes in the same session. For example, a real time mode, such as Voice-Over-IP and text chat, can be mixed with a non-real time mode, such as email. In this embodiment, a single moderator would send a message to each participant in a form appropriate for the participants contact mode, e.g., text chat, instant messaging, rapid email, and brail.

In yet another embodiment, the session monitor permits a customer to configure attributes associated with the session so as to create a desired image for other session participants. For example, the customer can select a desired video or Web appearance, a voice (e.g., a voice type such as male or female), a status such as platinum or tin, and a brand affiliation.

In another alternative embodiment, the session is a broadcast in which a different message is broadcast to each session participant. For example, the same message can be broadcast to participants in a common session in different languages (e.g., French and English) or a different message can be broadcast to the participants (e.g., one participant receives a first message about brand X and another receives a second message about brand Y).

In another embodiment, session availability is broadcast or advertised to a list of contacts or customers via various media. For example, the advertisement can be broadcast in real time to all queues and/or logged in customers and non-real time via email to other customers. The broadcast recipients are therefore a mixture of enqueued contacts and non-enqueued customers (who would contact the contact center just for the session).

In another embodiment, a session attribute is selected so as to create a desired, perceived physical background or setting for the session. For example, a perceived physical setting can be provided by selecting sights and sounds, such as adding echo or special effects to voices. For example, the sound of a fountain and clicking heels can be broadcast to create an atrium setting. Primary voices can be louder than secondary voices to simulate a crowded area. This embodiment can provide a more pleasurable ambience for a customer than conventional background music.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patent able subject matter.

What is claimed is:

1. A method of servicing customers' communications in a customer contact center which distributes customers' communications for servicing among resources based on skills needed by the communications and possessed by the resources, comprising:

collecting first customer information about a first customer communicating with the contact center;

collecting first contact center information about the contact center, the contact center capable of operating in one of a session state in which multi-customer sessions are set up and a non-session state in which multi-customer sessions are not set up, and wherein the session and non-session states are used at different times; and identifying, based on the first customer and contact center information, at least one multi-customer session available and of potential interest to the first customer;

presenting the first customer with the opportunity to participate in the at least one multi-customer session; and when the first customer elects to participate in the at least one multi-customer session, connecting the first customer with the at least one multi-customer session.

2. The method of claim 1, wherein the first customer information comprises a value of the customer, contact mode of the first customer's communication, contact media of the first customer's communication, multi-customer session history, contact center history, staffing levels, service levels, purpose of the first customers communication, communication path for first customer s communication, and conduct of first customer during the first customer's communication and the first contact center information comprises the number of customers enqueued in a queue corresponding to a skill, information regarding at least one of ongoing and scheduled multi-customer sessions, at least one of ongoing and scheduled demonstrations, and at least one of ongoing and scheduled discussion groups.

3. The method of claim 1, further comprises:
determining whether the at least one multi-customer session has an opening for the first customer.

4. The method of claim 3, further comprising:
when the at least one multi-customer session has no opening, setting a flag to contact the first customer in the event that the multi-customer session later has an opening.

5. The method of claim 1, wherein the first customer's communication is placed into a first queue and further comprising:
maintaining the first customer's position in the first queue after the first customer is connected with the at least one multi-customer session.

6. The method of claim 1, further comprising:
notifying the first customer with a message when the multi-customer session will commence.

7. The method of claim 1, further comprising:
scheduling the at least one multi-customer session to commence after termination of the current contact of the first customer with the contact center.

8. The method of claim 1, further comprising while the first customer is connected to the at least one multi-customer session:
providing the first customer with an opportunity to participate in a second multi-customer session different from the at least one multi-customer session.

9. The method of claim 1, further comprising before the connecting step:
connecting the first customer with a second customer while the first and second customers are enqueued in the contact center.

10. The method of claim 1, further comprising:
disclosing at least one attribute of the first customer to another customer in the at least one multi-customer session.

11. The method of claim 10, wherein the at least one attribute is at least one of a video image of the first customer, a voice of the first customer, and a status of the first customer assigned by the contact center.

12. The method of claim 1, further comprising during the first customer communication:
changing the first customer from a first contact mode to a different contact mode.

13. The method of claim 1, wherein a second customer is participating in the at least one multi-customer session and further comprising during the at least one multi-customer session:
broadcasting a message to the first customer in a first language and to the second customer in a second, different language.

14. The method of claim 1, wherein a second customer is participating in the at least one multi-customer session and further comprising during the at least one multi-customer session:
broadcasting a first message to the first customer and not the second customer and a second, different message to the second customer and not the first customer.

15. The method of claim 1, wherein the first customer and a second customer are participating in a common multi-customer session and wherein the first customer is participating in the common multi-customer session in a first mode and the second customer is participating in the common multi-customer session in a second, different mode, and wherein the first mode is in real time and the second mode is not in real time.

16. The method of claim 1, wherein the method steps are embodied as instructions on an information storage media.

17. The method of claim 1, further comprising:
generating background audio and/or video during the at least one multi-customer session to simulate a desired perceived physical setting for the participants.

18. A method of servicing customers' communications in a customer contact center which distributes customers' communications for servicing among resources based on skills needed by the communications and possessed by the resources, comprising:

determining whether a selected state of a plurality of operational states, exists for the customer contact center;

when the selected state exists, connecting a plurality of communications for servicing simultaneously to at least one said resource having a first skill, when the plurality of communications need the first skill; and wherein during a first operational state multi-customer sessions are set up and during a second operational state multi-customer sessions are not set up and wherein the states are used at different times.

19. The method of claim 18, wherein the selected state exists when at least one of the following conditions exists: a wait time for a queue exceeds a selected threshold, when a queue population exceeds a selected threshold, a staffing level is below a selected level, a predicted wait time exceeds a predetermined threshold, an expected wait time exceeds a predetermined threshold, a service goal is unmet, a business goal is unmet, an emergency condition is in existence, and at least one customer in communication with the contact center has a preference to participate in a session, and wherein the operational states can include, an In Session-Vacancies State, a Session Ending State, a New Session Scheduled State, a New Session Needed State and a New Session Not Needed State.

20. The method of claim 18, further comprising:
identifying a first customer associated with a first customer communication;
determining whether additional information associated with the first customer is needed; and
when additional information is needed, forwarding the first customer to a first resource.

21. The method of claim 20, further comprising:
determining whether a resource is available for a first skill and a first mode; and
when a resource is available, identifying customers corresponding to the first skill and mode.

22. The method of claim 21, further comprising:
when a plurality of customers need the first skill and share the first mode, connecting the plurality of customers for servicing simultaneously to the resource having the first skill.

23. The method of claim 21, further comprising:
determining whether the selected state is no longer in existence.

24. The method of claim 23, wherein, when the selected state is not in existence, the connecting step is not performed.

25. A method of servicing customers' communications in a customer contact center which distributes customers' communications for servicing among resources based on skills needed by the customers and possessed by the resources, comprising:
determining whether at least one resource is available for a first skill and a first contact mode;
when at least one resource is available, identifying customers corresponding to the first skill and contact mode; and
when a plurality of customers need the first skill and share the first contact mode, connecting the plurality of customers in a multi-party session for servicing simultaneously to the resource having the first skill; and
disabling during the multi-party session at least one of the plurality of customers from communicating with another customer and/or the resource.

26. The method of claim 25, wherein the resource is a human agent and wherein, during a first operational state, multi-customer sessions are set up and, during a second operational state, multi-customer sessions are not set up and wherein the states are used at different times.

27. The method of claim 25, wherein the resource is a single port of an automated communications-servicing arrangement and wherein the communications are voice calls or text chats.

28. The method of claim 25, further comprising:
collecting, from a first customer, customer and contact center state information;
based on the collected customer and contact center state information, filtering through a plurality of possible service options for the first customer;
thereafter presenting a smaller subset of the possible service options to the first customer for selection, the subset including the selected one of the first and second multi-customer sessions;
receiving, from the first customer, a selection of one of the subset of service options; and
effecting the provision of the selected service option to the first customer.

29. The method of claim 25, wherein the first contact mode is at least one of voice-only wired telephony, voice-over IP telephony, voice-only wireless telephony, multi-media telephony, non-voice IP telephony, and voice recordings.

30. The method of claim 25, further comprising:
comparing the number of the plurality of customers with a predetermined session population;
when the number of the plurality of customers at least one of equals or is less than the predetermined session population, performing the connecting step; and
when the number of the plurality of customers at least one of equals or is more than the predetermined session population, not performing the connecting step.

31. The method of claim 25, wherein the connecting step comprises:
preparing the resource for the multi-customer session;
configuring the multi-customer session; and
preparing the plurality of customers for the multi-customer session.

32. The method of claim 25, further comprising:
receiving a request from a first customer of the plurality of customers to transmit a communication to a second customer of the plurality of customers; and
enabling the first customer to transmit the communication to the second customer.

33. The method of claim 25, further comprising:
transmitting a token to a first customer of the plurality of customers, the token enabling the first customer to transmit a communication to a second customer and/or to the resource having the first skill.

34. The method of claim 25, further comprising one or more of:
enabling a first customer to play a game with a second customer, and
allowing first and second customers that are part of the session to send communications to one another.

35. The method of claim 25, wherein the method steps are embodied as instructions on an information storage media.

36. The method of claim 25, further comprising:
providing a transcript of the session to a customer.

37. The method of claim 25, further comprising:
changing a second, different contact mode of a first customer to the first contact mode to permit the first customer to participate in a session.

38. A method of servicing customers' communications in a customer contact center, in which customers' communications are distributed for servicing among resources based on skills needed by the communications and possessed by the resources, comprising:
identifying first and second sets of customers having first and second needs, respectively;

identifying first and second resources having first and second skills, wherein the first and second skills correspond to the first and second needs, respectively; and connecting the first set of customers simultaneously with the first resource and the second set of customers simultaneously with the second resource, wherein, during a first operational state, multi-customer sessions are set up and, during a second operational state, multi-customer sessions are not set up and wherein the states are used at different times.

39. The method of claim 38 wherein at least two customers in the first set of customers are enqueued in different queues.

40. The method of claim 38 wherein at least two customers in the first set of customers are connected to the first resource by means of different contact modes.

41. The method of claim 38 wherein a third set of customers have third needs, wherein the first and third needs relate to the same topic, and wherein the third set of customers are connected simultaneously with the first set of customers and the first resource.

42. A method for selecting a multi-customer session from among a plurality of possible multi-customer sessions for a resource in a contact center, comprising:

identifying a possible first multi-customer session for a contact center resource;

assigning a first value to the first multi-customer session;

identifying a possible second multi-customer session for the resource;

assigning a second value to the second multi-customer session;

comparing the relative magnitudes of the first value with the second value; and based on the comparing step, selecting one of the first and second multi-customer sessions.

43. The method of claim 42, wherein the first value is greater than the second value and the first multi-customer session is selected.

44. The method of claim 42, wherein the first and second values are indicative of a value of the corresponding multi-customer session to the contact center.

45. The method of claim 38, wherein the method steps are encoded as program instructions and recorded on an information storage media.

46. The method of claim 42, wherein the method steps are encoded as program instructions and recorded on an information storage media.

47. The method of claim 42, further comprising:

collecting, from a first customer, customer and contact center state information;

based on the collected customer and contact center state information, filtering through a plurality of possible service options for the first customer;

thereafter presenting a smaller subset of the possible service options to the first customer for selection, the subset including the selected one of the first and second multi-customer sessions;

receiving, from the first customer, a selection of one of the subset of service options; and effecting the provision of the selected service option to the first customer.

\* \* \* \* \*